(12) United States Patent
Kimchi et al.

(10) Patent No.: US 12,724,758 B1
(45) Date of Patent: Sep. 1, 2026

(54) SYSTEM AND METHOD FOR GENERATING A DIGITAL BACKUP OF DATABASE APPLICATIONS TO ALLOW DATABASE OPERATIONS

(71) Applicant: Eon IO, Ltd., Tel Aviv (IL)

(72) Inventors: Ron Kimchi, Tel Aviv (IL); Ofir Ehrlich, Tel Aviv (IL); Dmitry Kuznetsov, Tel Aviv (IL); Assaf Natanzon, Tel Aviv (IL); Yaniv Ptashnik, Tel Mond (IL); Ran Mizrachi, Mishmar (IL); Peleg Kazaz, Tel Aviv (IL); Benjamin Gruenbaum, Herzliya (IL); Orly Amir, Ramat Gan (IL); Ilya Surdin, Ramat Gan (IL)

(73) Assignee: Eon IO, Ltd., Tel Aviv (IL)

( * ) Notice: Subject to any disclaimer, the term of this patent is extended or adjusted under 35 U.S.C. 154(b) by 0 days.

(21) Appl. No.: 19/093,799

(22) Filed: Mar. 28, 2025

Related U.S. Application Data

(63) Continuation-in-part of application No. 19/051,930, filed on Feb. 12, 2025, now Pat. No. 12,436,845, and a continuation-in-part of application No. 19/042,474, filed on Jan. 31, 2025.

(51) Int. Cl.

| | |
|---|---|
| ***G06F 16/00*** | (2019.01) |
| ***G06F 16/215*** | (2019.01) |
| ***G06F 16/22*** | (2019.01) |
| ***G06F 16/28*** | (2019.01) |
| ***G06F 18/22*** | (2023.01) |

(52) U.S. Cl.
CPC .......... *G06F 16/221* (2019.01); *G06F 16/215* (2019.01); *G06F 16/2255* (2019.01); *G06F 16/284* (2019.01); *G06F 18/22* (2023.01)

(58) Field of Classification Search
CPC .................................................... G06F 16/221
USPC ......................................................... 707/802
See application file for complete search history.

(56) References Cited

U.S. PATENT DOCUMENTS

| | | | | |
|---|---|---|---|---|
| 6,553,366 | B1 * | 4/2003 | Miller | G06F 16/284 707/707 |
| 7,162,464 | B1 * | 1/2007 | Miller | G06F 16/2465 706/50 |
| 10,922,303 | B1 | 2/2021 | Bruck et al. | |
| 11,068,504 | B2 | 7/2021 | Nam et al. | |
| 11,087,054 | B2 | 8/2021 | Austern et al. | |
| 11,630,813 | B1 | 4/2023 | Plenderleith et al. | |
| 12,524,813 | B1 | 1/2026 | Villani | |
| 12,561,473 | B1 | 2/2026 | So et al. | |
| 2002/0169767 | A1 | 11/2002 | Harvey | |
| 2006/0282422 | A1 | 12/2006 | Al-Omari | |
| 2016/0078085 | A1 | 3/2016 | Hu et al. | |

(Continued)

*Primary Examiner* — Alexandria Y Bromell
(74) *Attorney, Agent, or Firm* — M&B IP Analysts, LLC

(57) ABSTRACT

A system and method for generating a quarriable backup of database applications to allow database operations is provided. The method includes accessing a plurality of database applications deployed in a cloud environment; exporting data stored in the database applications to a plurality of files, each file utilizing a column-oriented storage format; generating metadata based on the plurality of exported files, where the metadata includes at least a hash map of related-columns and a list of related-tables; and generating a quarriable backup based on a plurality of exported files and the metadata.

20 Claims, 6 Drawing Sheets

(56) References Cited

U.S. PATENT DOCUMENTS

| | | | |
|---|---|---|---|
| 2019/0354621 | A1 | 11/2019 | Wang et al. |
| 2020/0341978 | A1 | 10/2020 | Shah et al. |
| 2022/0156238 | A1 | 5/2022 | Kunzle et al. |
| 2022/0342879 | A1 | 10/2022 | Dong et al. |
| 2023/0222038 | A1 | 7/2023 | Kunzle et al. |
| 2023/0252233 | A1 | 8/2023 | Gutierrez et al. |
| 2023/0306061 | A1 | 9/2023 | Bui et al. |
| 2024/0070448 | A1 | 2/2024 | Sagar et al. |
| 2024/0252154 | A1 | 8/2024 | Vermeulen et al. |
| 2024/0362278 | A1 | 10/2024 | PerezLeon et al. |
| 2024/0394249 | A1 | 11/2024 | Cunningham et al. |
| 2024/0419706 | A1 | 12/2024 | Gutierrez |
| 2025/0013649 | A1 | 1/2025 | Gladwin et al. |
| 2025/0021148 | A1 | 1/2025 | Gladwin et al. |
| 2025/0021560 | A1 | 1/2025 | Gladwin et al. |
| 2025/0021566 | A1 | 1/2025 | Gladwin et al. |
| 2025/0077511 | A1 | 3/2025 | Zhao et al. |
| 2025/0110948 | A1 | 4/2025 | Nguyen et al. |
| 2025/0152337 | A1 | 5/2025 | Bruchman et al. |
| 2025/0156413 | A1 | 5/2025 | Barkan et al. |

* cited by examiner

SYSTEM AND METHOD FOR GENERATING A DIGITAL BACKUP OF DATABASE APPLICATIONS TO ALLOW DATABASE OPERATIONS

CROSS-REFERENCE TO RELATED APPLICATION(S)

This application is a continuation-in-part of and claims the benefit of priority under 35 U.S.C. § 120 to U.S. patent application Ser. No. 19/042,474, filed on Jan. 31, 2025, entitled "System and Method for Performing Join Operations in Digital Backups of Database Applications." This application is also a continuation-in-part of U.S. patent application Ser. No. 19/051,930, filed on Feb. 12, 2025, entitled "Multi-database Query Model in a Database Backup System." The subject matter of the aforementioned applications is hereby incorporated by reference in their entirety for all purposes.

TECHNICAL FIELD

The present disclosure relates generally to digital backup and restoration, and specifically to performing database operations on database backups.

BACKGROUND

A non-relational database (often called NoSQL database) is a type of database that does not use the traditional table-based relational structure (rows and columns) like SQL databases. Instead, it uses flexible data models that allow for scalability, speed, and diverse data storage. Examples of NoSQL databases include MongoDB and CouchDB. Examples of SQL databases include PostgreSQL, MySQL, MSSQL, and the like.

A database operation refers to any action performed on a database, such as inserting, retrieving, updating, or deleting data. These operations are fundamental for managing and interacting with databases. A database operation cannot be performed among databases of different types (e.g., PostgreSQL and MongoDB) or even between two different databases of the same type (e.g., PostgreSQL and MySQL). For example, SQL databases follow a structured query language (SQL) and use predefined schemas with tables, rows, and columns. NoSQL databases are often schema-less, highly scalable, and follow BASE (Basically Available, Soft state, Eventually consistent) principles.

Database backup is the process of creating copies of data to protect against data loss, corruption, or hardware failure. Backups ensure that information can be restored if something goes wrong, maintaining data availability and minimizing downtime. There are several types of backups used to meet different recovery needs. Currently, backups do not support database operations, let alone a database operation between different types of databases.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include accessing a plurality of database applications deployed in a cloud environment. The method may also include exporting data stored in the database applications to a plurality of files, each file utilizing a column-oriented storage format. The method may furthermore include generating metadata based on the plurality of exported files, where the metadata includes at least a hash map of related-columns and a list of related-tables; and generating a quarriable backup based on a plurality of exported files and the metadata. Other embodiments of this aspect include corresponding computer systems, apparatus, and computer programs recorded on one or more computer storage devices, each configured to perform the actions of the methods.

Implementations may include one or more of the following features. The method where the plurality of exported files is in a column-oriented storage format. The method where generating the metadata further may include: normalizing column values of tables in the database applications; unifying columns names of tables in the database applications; identifying related-columns based on at least the normalizing columns values; and determining related-tables based on the identified related-columns. The method where normalizing the column values of tables in the database applications further may include: determining a category for each column of each table in the database applications; normalizing column values of each column; and computing similar values.

The method where normalizing the column values of each column further may include: applying a normalization function selected based on the category of a respective column; and saving the normalized column values in the quarriable backup.

The method where determining the category of each column further may include: prompting a large language model (LLM) with at least a set of values of a column to determine the category of the column.

The method where identifying the related-columns further may include: computing hash-based signatures for at least two columns in the normalized column values; and designating columns as having similar values upon determining that columns share a threshold overlap in their computed hash-based signatures, where at least two columns having similar values are related-columns.

The method where determining the related-tables further may include: designating at least two tables having related-columns as related-tables. The method where the quarriable backup includes tables or data of different database applications.

The method may include: performing the database operations on the quarriable backup including tables or data of different database applications. The method where a database operation includes any one of: retrieve, insert, delete, and update. The method where a database application of the database applications includes any one of: a database hosted on a virtual machine and a relational database service (RDS) running on an infrastructure of the cloud environment. Implementations of the described techniques may include hardware, a method or process, or a computer tangible medium.

In one general aspect, a non-transitory computer-readable medium may include one or more instructions that, when executed by one or more processors of a device, cause the device to: access a plurality of database applications deployed in a cloud environment; export data stored in the database applications to a plurality of files, each file utilizing a column-oriented storage format; generate metadata based on the plurality of exported files, where the metadata includes at least a hash map of related-columns and a list of related-tables; and generate a quarriable backup based on a plurality of exported files and the metadata. Other embodiments of this aspect include corresponding computer systems, apparatus, and computer programs recorded on one or more computer storage devices, each configured to perform the actions of the methods.

In one general aspect, a system may include one or more processors configured to: access a plurality of database applications deployed in a cloud environment; export data stored in the database applications to a plurality of files, each file utilizing a column-oriented storage; generate metadata based on the plurality of exported files, where the metadata includes at least a hash map of related-columns and a list of related-tables; and generate a quarriable backup based on a plurality of exported files and the metadata. Other embodiments of this aspect include corresponding computer systems, apparatus, and computer programs recorded on one or more computer storage devices, each configured to perform the actions of the methods.

Implementations may include one or more of the following features. The system where the plurality of exported files is in a column-oriented storage format. The system where the one or more processors, when generating the metadata, are configured to: normalize column values of tables in the database applications; unify columns names of tables in the database applications; identify related-columns based on at least the normalizing columns values; and determine related-tables based on the identified related-columns.

The system where the one or more processors, when normalizing the column values of tables in the database applications, are configured to: determine a category for each column of each table in the database applications; normalize column values of each column; and compute similar values.

The system where the one or more processors, when normalizing the column values of each column, are configured to: apply a normalization function selected based on the category of a respective column; and save the normalized column values in the quarriable backup.

The system where the one or more processors, when determining the category of each column, are configured to: prompt a large language model (LLM) with at least a set of values of a column to determine the category of the column.

The system where the one or more processors, when determining the related-tables, are configured to: designate at least two tables having related-columns as related-tables. The system where the one or more processors, when determining the category of each column, are configured to: prompt a large language model (LLM) with at least a set of values of a column to determine the category of the column.

The system where the one or more processors are further configured to: perform the database operations on the quarriable backup including tables or data of different database applications.

The system where the one or more processors, when identifying the related-columns, are configured to: compute hash-based signatures for at least two columns in the normalized column values; and designate columns as having similar values upon determining that columns share a threshold overlap in their computed hash-based signatures, where at least two columns having similar values are related-columns.

The system where the quarriable backup includes tables or data of different database applications. The system where a database operation includes any one of: retrieve, insert, delete, and update. The system where a database application includes any one of: a database hosted on a virtual machine and a relational database service (RDS) running on an infrastructure of the cloud environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
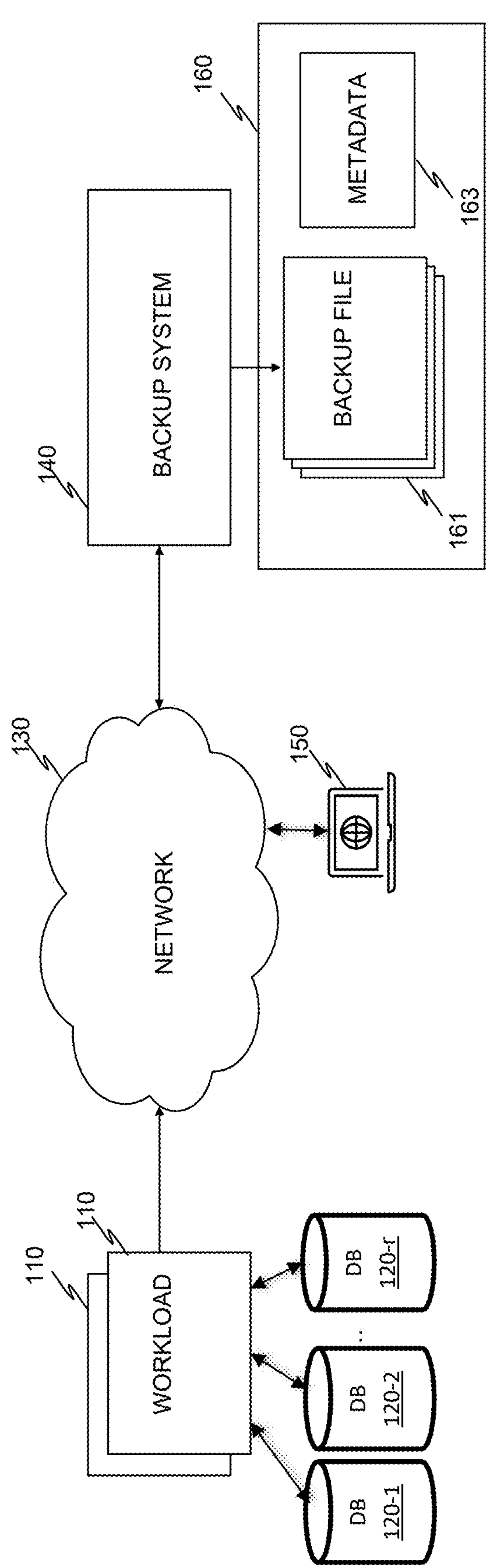
FIG. 1 is an example network diagram including a database backup system, utilized to describe an embodiment.

It is important to note that the embodiments disclosed herein are only examples of the many advantageous uses of the innovative teachings. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Database backup is the process of creating copies of data to protect against data loss, corruption, or hardware failure. Backups ensure that information can be restored if something goes wrong, maintaining data availability and minimizing downtime. There are several types of backups used to meet different recovery needs. A full backup captures the entire database, offering a complete snapshot at a specific point in time. Incremental backups, on the other hand, store only the changes made since the last backup, making them more space-efficient but requiring all previous backups for a full restoration. Differential backups store changes made since the last full backup, striking a balance between efficiency and ease of recovery.

Cloud-based databases can be implemented as managed databases, such as Amazon® RDS, or by deploying a virtual machine, such as an Amazon® EC2 instance with a database application installed thereon. Such a machine can include many temporary files which occupy a large amount of storage space. Additionally, an older database backup may utilize a previous version of the database application, such that when it is restored might cause a cybersecurity risk, as an outdated application.

The disclosed embodiments allow for performing database operations on databases of the same types, different types, or with the same database. A database operation ("DB operation") may include a command for inserting, retrieving, updating, or deleting data. According to an embodiment, the DB operation is enabled on a database backup being generated in an efficient way to solve a number of technical problems, such as slow backup and recovery, and slow execution of join operations. It should be emphasized that currently, there is no solution in the related art that allows for performing DB operations among multiple tables residing in different databases of different types (e.g., MySQL and MongoDB). As a prime example of the technical problem of the related art, an SQL query cannot be executed on a MongoDB database.

The disclosed embodiments allow considering multiple tables from the same or different databases, normalizing the contents of data, and unifying the naming of the columns. The join operation is performed by searching for columns in different tables with substantially similar content and mapping them. The search is performed on pre-computed hash values that allow fast operation while saving on compute resources.

FIG. 1 is an example network diagram including a database backup system, utilized to describe some disclosed embodiments. As illustrated in FIG. 1, a plurality of databases 120-1, 120-2, . . . , **120-*r* are backed up by the backup system 140 into backup files 161. Database 120 may include a database application, a database management system (DBMS), a combination thereof, and the like. In some embodiments, a database 120 may be a column-oriented database, a relational database, a tabular relational database, a document-oriented database, and the like. For example, a database 120-1 is implemented using MySQL and a database 120-1 is MongoDB. In an embodiment, database 120** may include metadata, such as a database schema. In some embodiments, the database schema includes a data structure, such as a table, including a plurality of keys, at least a portion of which correspond to columns of the table.

In certain embodiments, the databases 120 are deployed on one or more workloads 110. In an embodiment, workload 110 is a physical computing device, a virtual computing device (e.g., a virtual machine), a combination thereof, and the like. In some embodiments, a workload 110 is a software container. In an embodiment, a software container is deployed on a software container platform, such as Kubernetes®, Docker®, and the like.

According to an embodiment, a workload 110 is implemented as a virtual machine, a software container, a serverless function, a combination thereof, and the like. In some embodiments, a database 120 is implemented as a managed database, for example utilizing Amazon® RDS. In an embodiment, a virtual machine is deployed as an Amazon® EC2 instance. A software container is deployed on a container platform such as Kubernetes®, Docker®, and the like. In some embodiments, a serverless function is deployed as an Amazon® Lambda function.

In an embodiment, workload 110 is configured to provide access to database 120, for example, over a network 130. In some embodiments, a cloud computing infrastructure is implemented on network 130. For example, in an embodiment, a cloud computing infrastructure is Amazon® Web Services (AWS), Google® Cloud Platform (GCP), Microsoft® Azure, and the like. In certain embodiments, the cloud computing infrastructure is utilized to deploy a cloud computing environment. In an embodiment, a cloud computing environment is a virtual private cloud (VPC), a virtual network (VNet), a virtual private network (VPN), a combination thereof, and the like.

In some embodiments, workload 110 is configured to provide access to database 120 to a database backup system 140 (also referred to as a backup system 140). In an embodiment, backup system 140 is configured to generate a backup of databases 120. In an embodiment, backup system 140 is implemented as a virtual machine, a software container, a serverless function, a combination thereof, and the like.

In an embodiment, backup system 140 is configured to generate a backup of a database by determining a retrieval key of database 120. For example, the data backup includes only data of the database. Only data of the database includes data exported from the database, a database schema, a combination thereof, and the like.

According to an embodiment, data, information, and the like that allow the generation of a restored machine include a filesystem, a directory, a registry, configuration information, software product keys, a combination thereof, and the like. For example, according to an embodiment, machine backup includes an identifier of an operating system (such as Windows®, Linux®, etc.), an identifier of a database application (e.g., Apache® Derby), a filesystem, a registry file, a configuration file, a combination thereof, and the like.

Backup system 140 is configured to generate a restored database from the backup files 161. The restored database contains original data prior to backup regardless of the changes made during the backup process.

In an embodiment, backup system 140 is configured to generate a data backup based on the data stored in databases 120. In certain embodiments, data backup includes a plurality of backup files 161. In an embodiment, backup files 161 are a plurality of data files, stored each as a column-oriented data file. A column-oriented data file is, for example, Apache® Parquet. In an embodiment, values of each column of the database are stored in serial, contiguous, and the like, memory locations, which allows several benefits, such as improved column-wise compression and reduced query execution processing by reading only the column and not an entire row of data, where the contents of the row may not be relevant to the query.

Backup system 140 may be configured to determine a retrieval key of the database. The retrieval key may be any key, value, keyword, index, or the like. To this end, backup system 140 is configured to generate a plurality of queries based on the retrieval key, each query returning a plurality of rows of data from the database. The plurality of rows may be stored as at least a column-oriented data file, e.g., the backup files 161.

According to an embodiment, a retrieval key is a database key that includes values unique to each row. For example, a retrieval key is, in an embodiment, an index value. As no two rows can have the same index value, an index value can be used as a retrieval key. In some embodiments, a retrieval key is a composite key, i.e., a combination of a key value of a first column and a key value of a second column, which together form a unique value.

According to the disclosed embodiments, backup system 140 generates metadata 163 that facilitates DB operations in one or more tables. These tables may originate from the same database 120 or from different databases (e.g., 120-1 or 120-2), which can be of the same or different types. The metadata 163 includes the content category of each column in every table within database 120, a list of related-tables, a hash map mapping related-columns, original column values, and original column names. The various embodiments for generating the contents of the metadata are discussed above.

The plurality of backup files 161 (in column-oriented data format) together with the metadata 163 create a quarriable backup 160 that a user, of a user device 150, can run DB operations on. As will be discussed herein, the quarriable backup 160 includes the tables from one or more databases 120.

In one embodiment, backup system 140 categorizes the contents of the columns of tables in databases 120. The incudes running, by a generative AI (GenAI) system, a large language model (LLM) on the contents of each column to provide a description of that content. This generated description may be then used as the column name, ensuring a unified naming convention across different tables. It is important to note that while the name of a column in a table remains unchanged, it serves as a unified designation for identifying tables that can be joined.

For example, columns that contain residential addresses in different tables may be labeled as "home address," "place of residency," or "mailing address." While the format of the content may be similar, or perhaps even identical, LLM would classify the contents of these columns under the same description. This information could then be processed using the LLM for classification. An example prompt may include:

"What would be a category for a column in a database having the following column values: 150 Morristown rd., Basking Ridge, NJ; 201 Broadway Ave, NY; 130 main street, Springfield NJ"

In one embodiment, the same prompt and the same large language model (LLM) are utilized to unify the column names, ensuring consistent results. An LLM can include, but is not limited to, various types of large language models, such as GPT-4 (OpenAI), Claude (Anthropic), Gemini (Google), and LLAMA (Meta), among others. In an embodiment, the prompt may be a preconfigured template, where the contents of the columns are the variable parts of this template. In one example, only a subset of the values from a column is included in the prompt and provided to the language model (LLM). This approach is used to improve response time and decrease the computational resources required by the LLM. The LLM may be operated by a generative AI system, which may be defined as the processing circuitry of the backup system 140. In one embodiment, the generative AI system is external to system 140 and is accessed by the backup system 140 through an API.

In an embodiment, backup system 140 normalizes the values in the columns of tables maintained in databases 120. This normalization is carried out using a function that is chosen based on the category assigned to each column. For instance, columns that represent dates are standardized to a uniform format (DD, MM, YYYY). In one example embodiment, the normalization function can be executed by an LLM by providing an appropriate prompt or through processes designed to enable such normalization.

In one embodiment, the original column names and their corresponding unified column names are stored in metadata 163. Additionally, both the original values and their normalized equivalents are saved in metadata 163. Alternatively, the normalized values can be stored in the backup, while a reverse normalization function may be included in the backup metadata of the backup table. As previously mentioned, the quarriable backup 160 can include multiple backup files 161, each formatted as a column-oriented data file.

In one embodiment, the quarriable backup 160 includes unified column names and normalized column values, which are used to perform DB operations on database tables in the databases 120. Such tables can belong to the same type of database or different types of databases. To this end, a user of a user device 150 enters an input command, which may include an SQL query, a NoSQL query, or a free-text query. The user may select one more table to run the query on. A user device 150 may be a laptop, a personal computer a smartphone, or any device that can access the database backup system 140. Access is via, for example, a web portal.

It should be noted that NoSQL databases do not maintain data in tables. According to the disclosed embodiments, data from NoSQL databases is stored in a table format that users can access. For example, in MongoDB, a collection of documents is used, where each document is converted into a row. Common files of the documents become columns, while any remaining files are consolidated into a final column.

In one embodiment, the process initiates by analyzing an input command and identifying search related-tables for executing the command. If the user specifies input tables, the system may automatically identify and suggest additional related-tables to the selected input tables.

For example, if the input command is an SQL query: Select first_name from Users, backup system 140 searches for related-tables to the "Users" tables that include similar column(s) to first_name, and runs the query on all such tables. The results are presented to the user.

In an embodiment, searching related-tables is based on related-columns. Related-columns at least two columns found in two different tables that have a sub-set of similar values in both columns. In this context, related-columns must be of the same type and share similar values with at least one of the columns in the input table. In an embodiment, identification of related-columns is based on a similarity hash method.

In an embodiment, the similarity hash method includes computing hash-based signatures for at least two columns in the normalized column values and designating columns as having similar values upon determining that columns share a threshold overlap in their computed hash-based signatures.

In an embodiment, the similarity hash method may also include computing, a number of similar values (denoted as 'n') using a hash function, such as a min hash function. In this case, 'n' can be a preconfigured parameter (e.g., n=1000), a percentage of the total number of values in the column (e.g., n=5%), or a combination of both. In this embodiment, hash values are computed based on the normalized values. The computed hash values may also be saved in backup files. In an embodiment, the parameter 'n' is set based on the size of a table. That is, the more entries in the table, the higher the value of 'n'. Therefore, different tables may have different values for 'n. A similarity search is conducted to identify whether two columns from different tables have 'k' matching values. The parameter 'k' is a pre-configured number that is smaller than the value of the parameter 'n'. If two or more columns share similar 'k' hash values, they are considered related-columns. The similar hash values may be identical or substantially alike.

In an embodiment, the similarity search for related-columns is performed on columns of the same category (e.g., date, last name, etc.). This would provide a fast response and reduce the compute resources consumed by backup system 140. In some embodiments, the similarity search is performed on the tables stored in the backups. The hash values are computed during the backup process.

In one embodiment, backup system 140 maintains a map, referred to as a "hash map," which associates hash values with a list of related tables that include the corresponding hash value. When a new column is added, backup system 140 computes hash values for this new column. Using the hash map, backup system 140 identifies tables that can be utilized to locate those that may include values similar to the new column's values. It then checks the intersecting columns in these identified tables to determine if they share 'k' common values. This process enables a fast search for related-columns.

Figure 2:
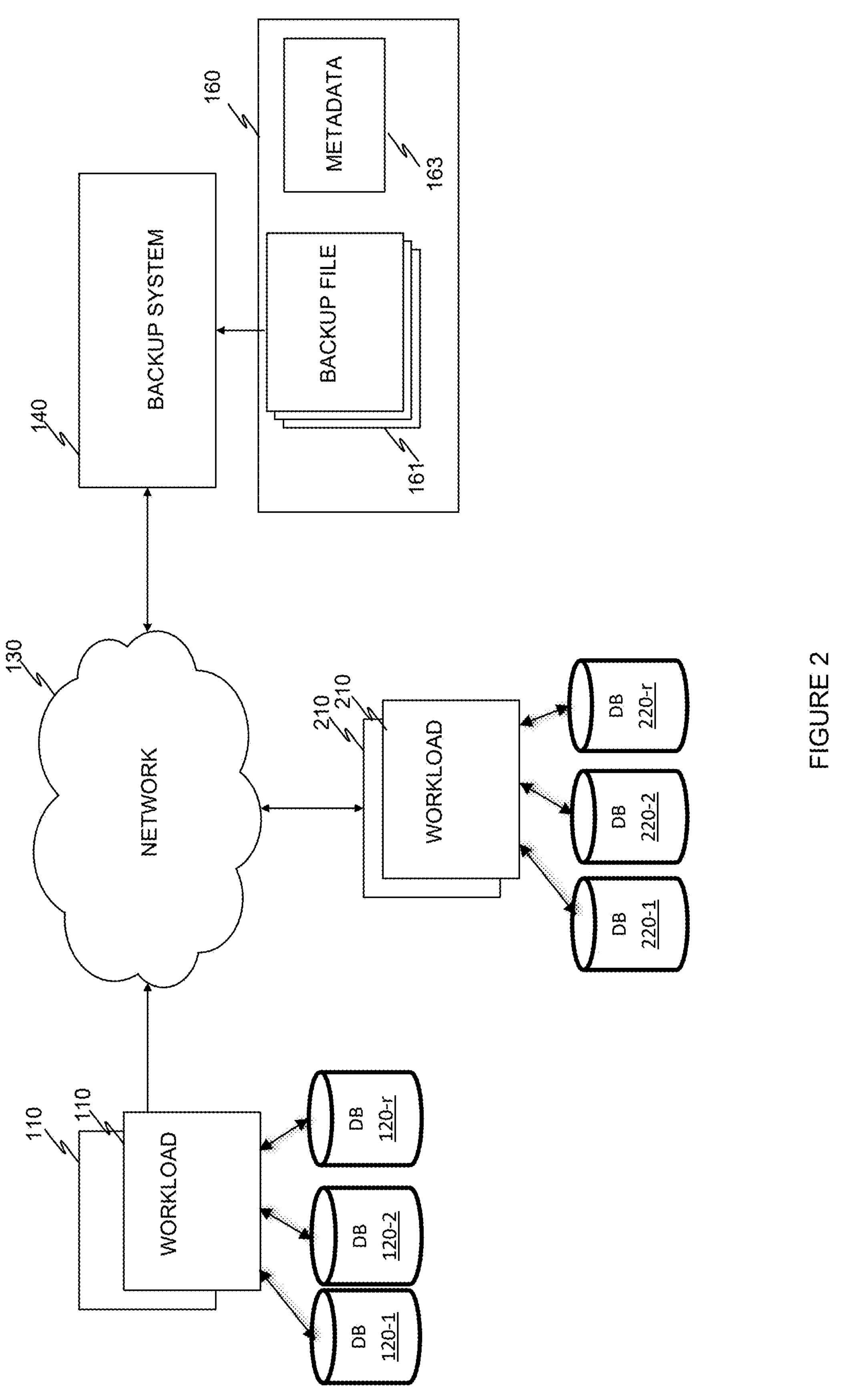
FIG. 2 is an example network diagram of a backup system performing a database restoration, utilized to describe an embodiment.

FIG. 2 is an example network diagram of a backup system performing a database restoration, utilized to describe an embodiment. According to an embodiment, a backup system 140 is configured to receive a request to restore a database application, including the database data thereof.

In an embodiment, backup system 140 is configured to instruct an orchestrator (not shown), other provisioning device, and the like, to deploy a restored workload 210, which corresponds to one or more workloads 110. For example, in an embodiment, the restored workload is deployed from an auto-scaling group (ASG) which is deployed in a VPC of a cloud computing environment.

Backup system 140 is configured to restore the workload 210 based on a file-level backup, a block-level backup, a plurality of software keys, and the like. For example, in an embodiment, the backup system 140 is configured to generate, provision, etc., an empty bootable machine volume. In an embodiment, a bootable machine volume is implemented utilizing Amazon® Elastic Block Storage (EBS).

According to the disclosed embodiments, during database restoration, the naming of the columns and their normalized values are converted to their original names and values, respectively. When the original values are saved in the backup files such values are used in the restoration process. When the normalizing functions are saved in the backup files, reverse normalized functions are used to restore the original values.

According to some embodiments, data of the backup files 161 is copied into databases 220-1, 220-2, . . . , 220-*r*. In certain embodiments, a workload 210 is configured to query the backup files 161 while the data of the backup files 161 is being written, copied, etc. to, for example, a database 220-1. This provides access to the data while performing the restoration. For example, a database application of a database 220 is configured to receive a query for execution thereon. Here, the database application is configured to execute the query on the backup data files 161 in response to determining that backup data files 161 have not yet been completely written to database 220.

Figure 3:
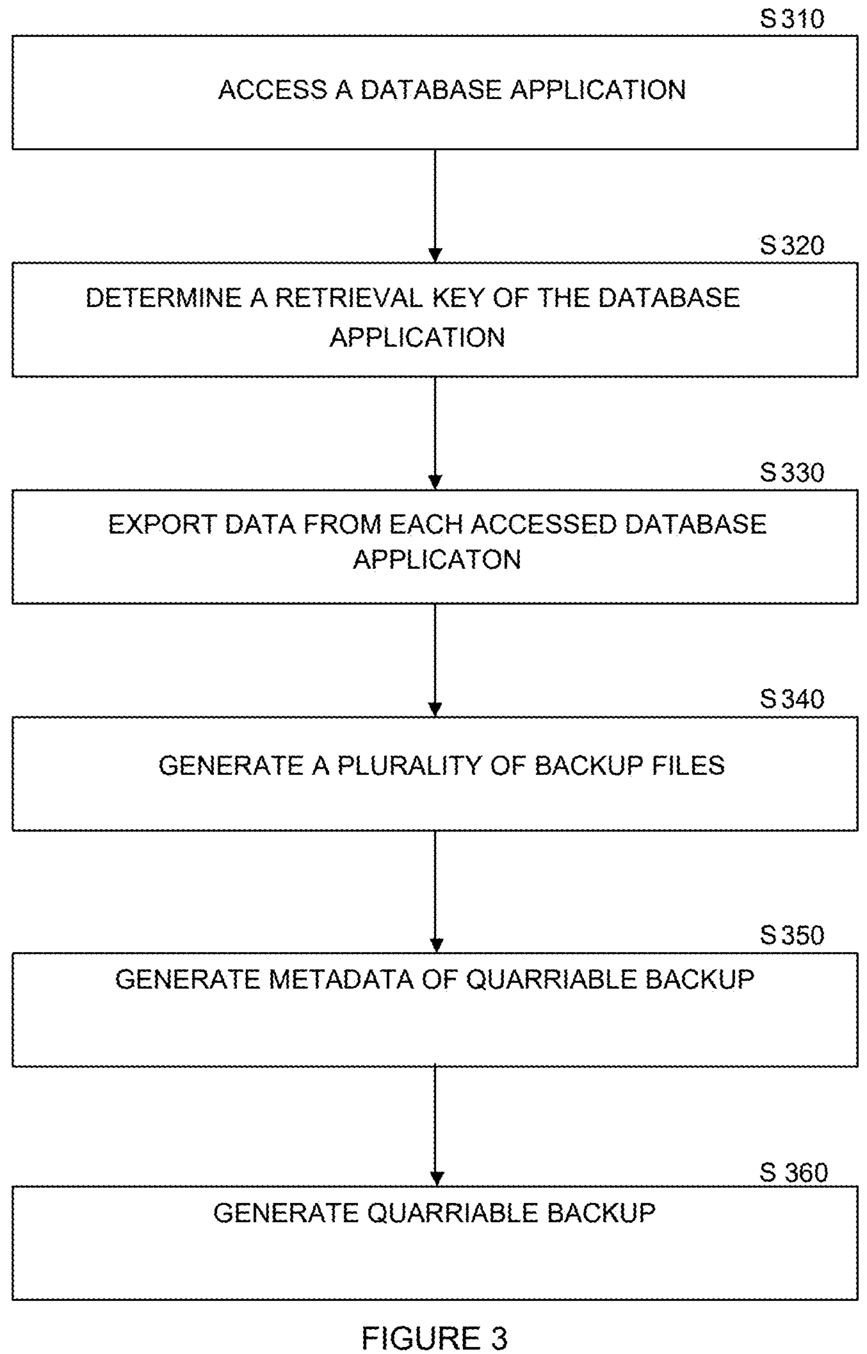
FIG. 3 is an example flowchart of a method for generating a database backup, implemented in accordance with an embodiment.

FIG. 3 is an example flowchart of a method for generating a quarriable backup that can be utilized for DB operations in accordance with an embodiment. The method may be performed by backup system 140.

At S310, a database application is accessed. In an embodiment, accessing a database application includes detecting a database application deployed in a computing environment, such as a cloud computing environment. According to some embodiments, accessing a database application includes receiving a token, a credential, a combination thereof, and the like, to access the database. In an embodiment, accessing the database application includes accessing a machine, a workload, and the like, on which the database application is deployed.

According to certain embodiments, the database application is a stand-alone database application deployed on a virtual machine. The database application may include an SQL database or a NoSQL database. Examples of NoSQL databases include MongoDB® and CouchDB®. Examples of SQL databases include PostgreSQL, MySQL, MSSQL, and the like. It should be noted that the backup process is performed for any type of database application. That is, the same process can be performed for SQL, NoSQL, or any other type of database application.

NoSQL databases use different terminology than SQL (relational) databases for the data they store. For example, in SQL databases, a "table" corresponds to a "collection," a "row" is similar to a "document," a "column" is equivalent to a "field," and a "primary key" is represented by an "ID," which serves as the default unique identifier. This description will primarily employ terminology from SQL databases for clarity, but the disclosed embodiments are not limited to these types of databases. It should be noted that S310 is performed for each SQL table to be backed up.

In an embodiment, a database application is deployed in a cloud environment and may include a database (e.g., MySQL or MongoDB) hosted on a virtual machine or a relational database service (RDS) running on an infrastructure of the cloud environment. Examples may include Amazon® RDS, Azure® SQL Database, Google® Cloud SQL, IBM Cloud Databases, and the like.

At S320, a retrieval key of the database application is determined. In some embodiments, the retrieval key is an index of rows, for example. The retrieval key may include a value assigned to each row, which is a unique value, such that no two rows include the same value of the retrieval key.

In some embodiments, a retrieval key is generated based on a composite of multiple-column identifiers. For example, in an embodiment, two identifiers, each of a distinct column, form together a retrieval key. In certain embodiments, a plurality of retrieval keys are selected, each retrieval key corresponding to a table of the database.

At S330, data is exported from each of the accessed database applications. The exported data may include at least tables and their contents. In an embodiment, exporting data from the database application includes generating a plurality of queries. In an embodiment, such queries are generated, each based on a value range of the retrieval key. For example, in an embodiment, a first query of the plurality of queries is generated based on a value range of '0' to '10,000' of the retrieval key, and a second query of the plurality of queries is generated based on a value range of '10,001' to '20,000'. In an embodiment, there is no overlap between the values of the retrieval key for each of the generated queries.

In an embodiment, a query is generated in a query language, such as SQL. In an embodiment, data is exported from the database utilizing a logical backup. For example, in a PostgreSQL database, a pg_dump command is utilized to export data from a database application to a logical backup. According to an embodiment, a logical backup includes schema and data as query language (e.g., SQL) commands, binary format, and the like. In an embodiment, a logical backup is a consistent snapshot, as opposed to a physical backup, which includes, for example, configuration files, raw files, directories, etc. As another example, in MongoDB, an export command mongoexport can be utilized to export collections (tables).

At S340, a plurality of backup files is generated. In an embodiment, the plurality of backup files is generated in a column-oriented data format, such as, but not limited to, Apache® Parquet. In some embodiments, the plurality of backup files is generated such that a file, a group of files, etc., corresponds to a result of executing a query of the plurality of queries. Thus, data is exported from the database into a plurality of backup files.

In an embodiment, data is exported from a database application into the plurality of backup files by generating the plurality of queries, executing each query on the database, receiving a result for each query, and storing the results as data files in a column-oriented data format.

In some embodiments, for example, where a logical backup is generated (e.g., utilizing pg_dump command), the plurality of backup files is generated by converting the logical backup into a plurality of column-oriented data format files.

In some embodiments, for example, when collections are exported (e.g., utilizing mongoexport/or mongodump command), the plurality of backup files is generated by converting the logical backup into a plurality of column-oriented data format files.

At S350, the metadata of the quarriable backup is generated. The process for generating the metadata is executed on all exported backup files and includes unifying column names, normalizing column values, identifying related-columns, and determining related-tables.

Figure 4:
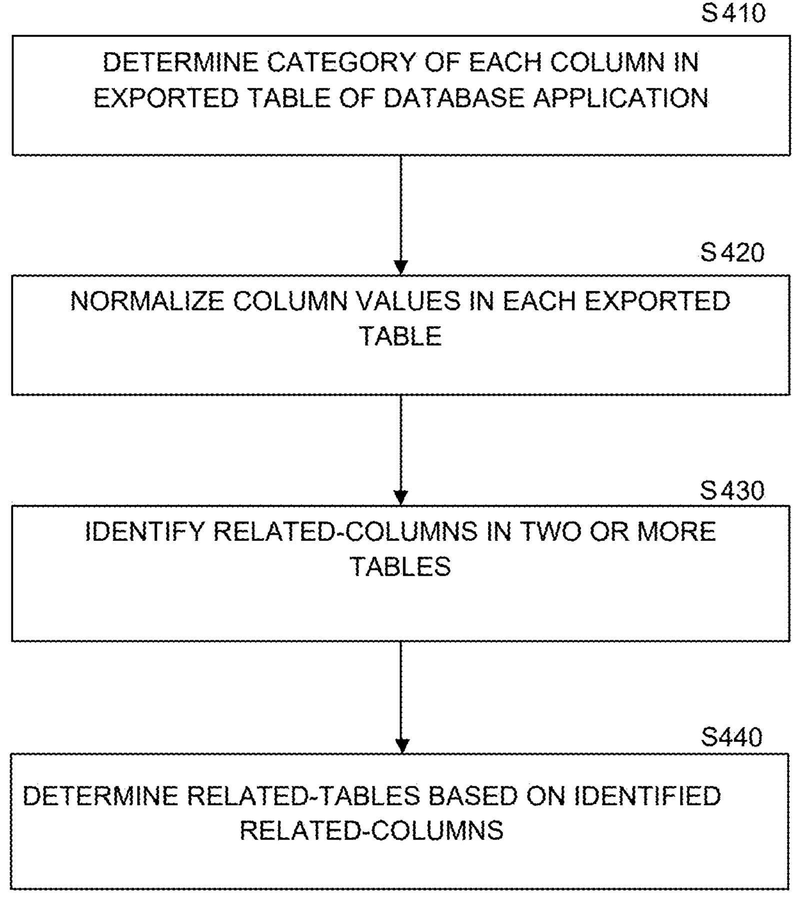
FIG. 4 is an example flowchart of a method for creating a quarriable database backup implemented according to an embodiment.

Reference is now made to FIG. 4, which illustrates the process of S350 for generating a quarriable backup according to an embodiment. FIG. 4 may be executed by the backup system 140.

At S410, the category of each column within each exported table of the database application is determined. This categorization may be performed using an LLM executed by a generative artificial intelligence (GenAI) system. Specifically, as discussed above, a prompt is generated to determine the category of the columns based on their contents or a subset thereof, and is then processed by the LLM. S410 is performed for each table in a database application.

In an embodiment, S410, also includes unifying the column names based on the determined category. Additionally, S410 includes storing, in the metadata (163), the original column names and their corresponding unified name.

At S420, the values of columns in each exported table are normalized. This normalization process can be carried out using a normalization function, a large language model (LLM), or a combination of both. The specific normalization function and/or the prompt given to the LLM is selected based on the category of each respective column.

For instance, a normalization function may involve several tasks, such as converting date values to a consistent format, standardizing physical addresses to USPS format, or reformatting personal names to follow the structure "Last Name, First Name," among others.

In an example embodiment, when employing an LLM for normalization, the prompt will include the type of category, a description of the requested format, and the contents of the column that need to be normalized. For example, the instruction might be to change the following date values to the format "DD, MM, YYYY." A template for such a prompt may be preconfigured for ease of use.

In an embodiment, S420 includes storing original column values and their respective normalized values in the metadata (163). In another embodiment, only the normalized values are saved in the quarriable backup, while the reverse normalization function is saved in the metadata of the quarriable backup. The reverse normalization function, when executed, returns the normalized values to their exact original values. That is, there is no data loss in the normalization process.

Following is an example demonstrating the operation of S410 and S420. Tables 1.1 and 1.2 are shown. The table name of Table 1.1 is "Office Computers", the table name of Table 1.2 is "Devices Memory".

TABLE 1.1

| Computer Name | IP Address | CPU Type |
|---|---|---|
| PC-001 | 192.168.1.1 | Intel i5 |
| PC-002 | 192.168.1.2 | Intel i7 |
| PC-003 | 192.168.1.3 | AMD Ryzen 5 |
| PC-004 | 192.168.1.4 | AMD Ryzen 7 |
| PC-005 | 192.168.1.5 | Intel i9 |
| PC-006 | 192.168.1.6 | AMD Ryzen 9 |
| PC-007 | 192.168.1.7 | Intel Xeon |
| PC-008 | 192.168.1.8 | AMD EPYC |
| PC-009 | 192.168.1.9 | Apple M1 |
| PC-010 | 192.168.1.10 | Apple M2. |

TABLE 1.2

| Hexadecimal IP Address | Memory Size |
|---|---|
| C0A80101 | 64 GB |
| C0A80102 | 32 GB |
| C0A80103 | 32 GB |
| C0A80104 | 8 GB |
| C0A80105 | 128 GB |
| 0A000001 | 64 GB |
| 0A000002 | 8 GB. |

For example, when prompting an LLM, the column names "IP Address" and "Hexadecimal IP Address" are categorized under the broader category of "Network Address." The normalization function may involve converting the Hexadecimal IP Address into a standard IP address format. After unifying the column names and normalizing their values, the resulting tables are designated as Tables 2.1 and 2.2. The normalization process would convert hexadecimal values to their decimal equivalents.

TABLE 2.1

| Computer Name | Network Address | CPU Type |
|---|---|---|
| PC-001 | 192.168.1.1 | Intel i5 |
| PC-002 | 192.168.1.2 | Intel i7 |
| PC-003 | 192.168.1.3 | AMD Ryzen 5 |
| PC-004 | 192.168.1.4 | AMD Ryzen 7 |
| PC-005 | 192.168.1.5 | Intel i9 |
| PC-006 | 192.168.1.6 | AMD Ryzen 9 |

TABLE 2.1-continued

| Computer Name | Network Address | CPU Type |
|---|---|---|
| PC-007 | 192.168.1.7 | Intel Xeon |
| PC-008 | 192.168.1.8 | AMD EPYC |
| PC-009 | 192.168.1.9 | Apple M1 |
| PC-010 | 192.168.1.10 | Apple M2 |

TABLE 2.2

| Network Address | Memory Size |
|---|---|
| 192.168.1.1 | 64 GB |
| 192.168.1.2 | 32 GB |
| 192.168.1.3 | 32 GB |
| 192.168.1.4 | 8 GB |
| 192.168.1.5 | 128 GB |
| 10.0.0.1 | 64 GB |
| 10.0.0.2 | 8 GB |

At S430, related-columns in two or more tables are identified. In an embodiment, S430 includes computing hash-based signatures for at least two columns in the normalized data and designating the columns as related columns upon determining that the columns share a threshold overlap in their computed hash-based signatures. The related columns are maintained in a hash map. The hash map is stored in the metadata (163).

In another embodiment, S430 includes computing similar values for a predefined number ('n') of column values in each column. In an embodiment, similar values are computed over all normalized values in a column, where, from the calculated value, a set of ('n') values are selected as the searchable values.

In an embodiment, for each table column, a set of ('n') values are the minimal hash values in the column that are kept, e.g., in memory of backup system 140. To this end, a MinHash function is applied to normalized values in a column, where each hash value is a number. Then, a number of 'n' minimal (smallest) hash values are computed or otherwise selected on all the rows. By choosing minimal hash values, similar tables will represent a large number of identical hash values in a set of 'n' values. A MinHash function is a probabilistic function used to efficiently estimate the Jaccard similarity between two sets. For example, applying a MinHash function on Tables 2.1 and 2.2 and selecting n=5 would Result in 2 identical values between these tables.

It should be noted that similar values can be computed for any range of values in a column, not just the first n values, as demonstrated in the example above.

In one embodiment, S430 involves determining for each column in the input table whether there is a column in a different table that shares at least 'k' similar searchable values (e.g., mini hash values). The parameter 'k' is an integer value that is smaller than the total number of searchable values ('n') computed for each column. If such 'k' values are found in two respective columns, the columns are considered related-columns.

For example, in Tables 2.1 and 2.2, the columns labeled "Network Address" are regarded as related-columns because they share a total of two similar values (assuming that 'k' is equal to or less than 5). Additionally, S430 includes the process of determining a set of tables included in the backup for the search. In one embodiment, this set may consist only of tables that have at least one matching column name with the input table. In another embodiment, the set of tables may be identified using a hash table that maps hash values to lists of tables containing those hash values.

At S440, related-tables are determined based on the identified related-columns. In an embodiment, any two tables that include related-columns are determined as related-tables. The determined related tables are maintained in a list, a graph, or any other type of data structure, which may be stored in the metadata (163) of the quarriable backup.

In some instances, the quarriable backup includes information such as a timestamp, a version identifier, reverse normalization functions, and original column names. This information indicates the date, time, or a combination of both when the backup was created. The data backup can be used to restore the database when needed.

Referring back to FIG. 3, a quarriable backup is generated at S360. In this embodiment, the quarriable backup is created using multiple backup files (exported at S340) and the metadata (created at S350). As noted above, the metadata includes normalized column values, unified column names, a hash map including related-columns, and the list of the determined related tables. The quarriable backup is a backup of one or more database applications that support DB options. In an embodiment, the quarriable backup includes at least two database applications of different types.

It should be noted that the generated quarriable backup is a data backup, in contrast to, for example, a machine backup. In some embodiments, the data backup includes a data structure, such as metadata of the database, a data schema of the database, table data, a store procedure, a view, a combination thereof, and the like. In an embodiment, database data (e.g., schema, views, store procedures, etc.) are extracted from a dump, for example utilizing pg_dump, without storing the data itself. Thus, a pg_dump command can be utilized to generate the data files in a first format that can be converted to, for example, files in a Parquet format.

It should be noted that the processes described in FIGS. 3 and 4 are performed for each table and database application to be backed up. It should be further noted that a data backup is not the same as a storage backup. In a storage backup, a block-for-block copy of the storage device is created, which includes the database data and also includes data that is not useful for the actual database application, such as temporary files. It is, therefore, advantageous to store a backup only of the data of the database, without all the unnecessary files, folders, etc., which are not essential for the database to function properly.

Figure 5:
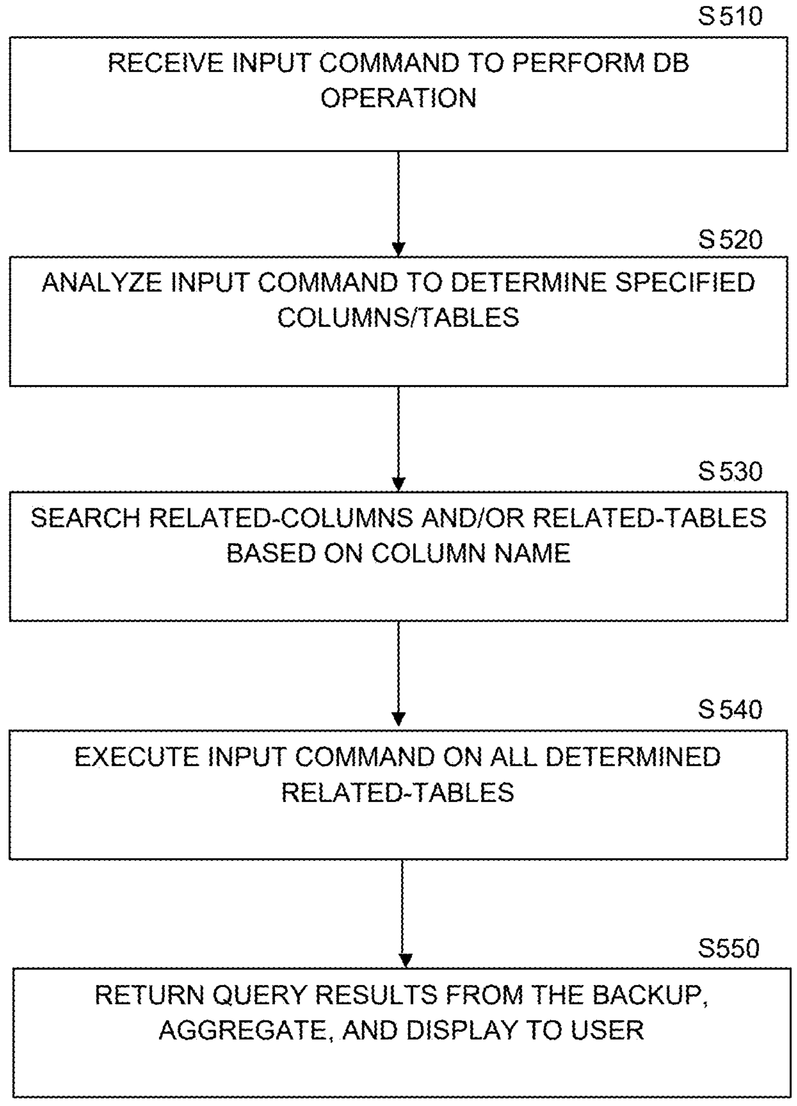
FIG. 5 is an example flowchart of a method for joining tables in accordance with an embodiment.

FIG. 5 is an example flowchart of a method for performing DB operations on the quarriable backup according to an embodiment. The method may be performed by backup system 140.

At S510, an input command to perform a DB operation is received. In an embodiment, the input command may be in a format of an SQL query, NoSQL command, or a free text query. In an embodiment, S510 may also include receiving an input table to perform the input command on.

At S520, the input command is analyzed to determine specified column(s) or table(s) designated therein. For example, an input command may include an SQL query: "SELECT Network Address FROM Office Computers". The "Office Computers" is the table name, and the "Network Address" is a "column".

At S530, based on the determined column name, related-columns and/or related-tables are searched. The related-columns are designed in the hash map and related-tables are searched in the list of related-applications. It should be noted that both hash map and the list of related-tables are stored in metadata of the quarriable backup. For example, Table 1.1 (Office Computers) and Table 1.2 (Devices Memory) are related-tables as they include related-columns "Network Address".

At S540, the input command is executed on all of the determined related-tables. In an embodiment, S540 includes running the input command in a format, or language, complaint with the database backup. In an example embodiment, the format of files is Parquet format, and input command is converted to an SQL query. Such conversion can be performed using an existing tool, such as DuckDB. Therefore, regardless of whether the database application hosts a related-table, the format of the query executed at S540 is the same. To emphasize this embodiment using the example given above, a first related-table may be a MySQL table, while a second related-table may be a MongoDB collection, the queries, generated from the input command, for both of these tables are SQL queries.

At S550, the query results from S540 are returned from the backup, aggregated, and displayed to the user. The aggregation is performed using standard aggregation functions, techniques, and/or tools. For example, the Athena aggregation function can be used.

Figure 6:
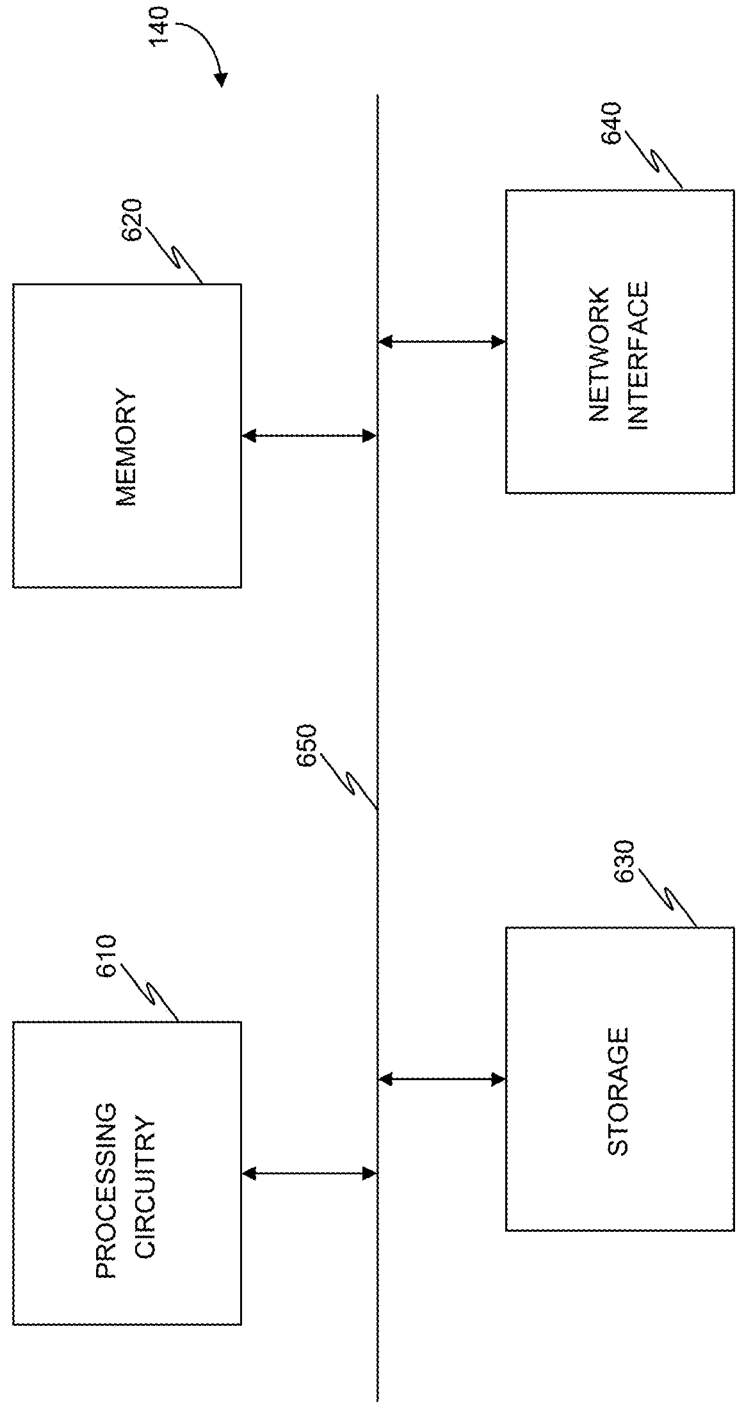
FIG. 6 is an example schematic diagram of a backup system according to an embodiment.

FIG. 6 is an example schematic diagram of a backup system 140 according to an embodiment. The backup system 140 includes, according to an embodiment, processing circuitry 610 coupled to a memory 620, a storage 630, and a network interface 640. In an embodiment, the components of the backup system 140 are communicatively connected via a bus 650.

In certain embodiments, the processing circuitry 610 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information. The processing circuitry 610 is configured to operate as a generative AI system to execute, train, and/or perform inference on any type of language model.

In an embodiment, the memory 620 is a volatile memory (e.g., random access memory, etc.), a non-volatile memory (e.g., read-only memory, flash memory, etc.), a combination thereof, and the like. In some embodiments, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein is stored in the storage 630, in the memory 620, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 610, cause the processing circuitry 610 to perform the various processes described herein, in accordance with an embodiment.

In some embodiments, the storage 630 is a magnetic storage, an optical storage, a solid-state storage, a combination thereof, and the like, and is realized, according to an embodiment, as a flash memory, as a hard disk drive, another memory technology, various combinations thereof, or any other medium which can be used to store the desired information.

The network interface 640 is configured to provide the backup system 140 with communication with, for example, the network 130, workload 110, database application 120, etc., according to an embodiment.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a quarriable backup of database applications to allow database operations, comprising:
- accessing a plurality of database applications deployed in a cloud environment;
- exporting data stored in the database applications to a plurality of files, each file utilizing a column-oriented storage format;
- generating metadata based on the plurality of exported files, wherein the metadata includes at least a hash map of related-columns and a list of related-tables;
  - wherein generating the metadata further comprises:
  - normalizing column values of tables in the database applications;
    - wherein normalizing the column values of tables in the database applications further comprises:
    - determining a category for each column of each table in the database applications;
    - normalizing column values of each column;
      - wherein normalizing the column values of each column further comprises applying a normalization function selected based on the category of a respective column; and
      - saving the normalized column values in the quarriable backup;
    - computing similar values;
  - unifying columns names of tables in the database applications;
  - identifying related-columns based on at least the normalizing columns values;
  - determining related-tables based on the identified related-columns; and
- generating a quarriable backup based on a plurality of exported files and the metadata.

2. The method of claim 1, wherein the plurality of exported files is in a column-oriented storage format.

3. The method of claim 1, wherein identifying the related-columns further comprises: computing hash-based signatures for at least two columns in the normalized column values; and designating columns as having similar values upon determining that columns share a threshold overlap in their computed hash-based signatures, wherein at least two columns having similar values are related-columns.

4. The method of claim 3, wherein determining the related-tables further comprises:
- designating at least two tables having related-columns as related-tables.

5. The method of claim 1, wherein determining the category of each column further comprises: prompting a large language model (LLM) with at least a set of values of a column to determine the category of the column.

6. The method of claim 1, wherein the quarriable backup includes tables or data of different database applications.

7. The method of claim 6, further comprising:
- performing the database operations on the quarriable backup including tables or data of different database applications.

8. The method of claim 7, wherein a database operation includes any one of: retrieve, insert, delete, and update.

9. The method of claim 1, wherein a database application of the database applications includes any one of: a database hosted on a virtual machine and a relational database service (RDS) running on an infrastructure of the cloud environment.

10. A non-transitory computer-readable medium storing a set of instructions for generating a quarriable backup of database applications to allow database operations, the set of instructions comprising: one or more instructions that, when executed by one or more processors of a device, cause the device to:
- access a plurality of database applications deployed in a cloud environment;
- export data stored in the database applications to a plurality of files, each file utilizing a column-oriented storage format;
- generate metadata based on the plurality of exported files, wherein the metadata includes at least a hash map of related-columns and a list of related-tables;
  - wherein generating the metadata further comprises:
  - normalizing column values of tables in the database applications;
    - wherein normalizing the column values of tables in the database applications further comprises:
    - determining a category for each column of each table in the database applications;
    - normalizing column values of each column;
      - wherein normalizing the column values of each column further comprises applying a normalization function selected based on the category of a respective column; and
      - saving the normalized column values in the quarriable backup;
    - computing similar values;
  - unifying columns names of tables in the database applications;
  - identifying related-columns based on at least the normalizing columns values;
  - determining related-tables based on the identified related-columns; and
- generate a quarriable backup based on a plurality of exported files and the metadata.

11. A system for generating a quarriable backup of database applications to allow database operations comprising: one or more processors configured to:
- access a plurality of database applications deployed in a cloud environment;
- export data stored in the database applications to a plurality of files, each file utilizing a column-oriented storage format;
- generate metadata based on the plurality of exported files, wherein the metadata includes at least a hash map of related-columns and a list of related-tables;
  - wherein generating the metadata further comprises:
  - normalizing column values of tables in the database applications;
    - wherein normalizing the column values of tables in the database applications further comprises:
    - determining a category for each column of each table in the database applications;
    - normalizing column values of each column;
      - wherein normalizing the column values of each column further comprises applying a normalization function selected based on the category of a respective column; and saving the normalized column values in the quarriable backup;

computing similar values;

unifying columns names of tables in the database applications;

identifying related-columns based on at least the normalizing columns values;

determining related-tables based on the identified related-columns; and generate a quarriable backup based on a plurality of exported files and the metadata.

12. The system of claim 11, wherein the plurality of exported files is in a column-oriented storage format.

13. The system of claim 11, wherein the one or more processors, when determining the category of each column, are configured to: prompt a large language model (LLM) with at least a set of values of a column to determine the category of the column.

14. The system of claim 11, wherein the one or more processors, when identifying the related-columns, are configured to: compute hash-based signatures for at least two columns in the normalized column values; and designate columns as having similar values upon determining that columns share a threshold overlap in their computed hash-based signatures, wherein at least two columns having similar values are related-columns.

15. The system of claim 13, wherein the one or more processors, when determining the related-tables, are configured to:

designate at least two tables having related-columns as related-tables.

16. The system of claim 11, wherein the one or more processors, when determining the category of each column, are configured to: prompt a large language model (LLM) with at least a set of values of a column to determine the category of the column.

17. The system of claim 11, wherein the quarriable backup includes tables or data of different database applications.

18. The system of claim 16, wherein the one or more processors are further configured to:

perform the database operations on the quarriable backup including tables or data of different database applications.

19. The system of claim 17, wherein a database operation includes any one of:

retrieve, insert, delete, and update.

20. The system of claim 11, wherein a database application of the database applications includes any one of:

a database hosted on a virtual machine and a relational database service (RDS) running on an infrastructure of the cloud environment.

* * * * *